United States Patent [19]

Kemeny et al.

[11] Patent Number: 5,279,639
[45] Date of Patent: Jan. 18, 1994

[54] COMPOSITIONS FOR SYNTHESIZING LADLE SLAGS

[75] Inventors: Frank L. Kemeny, Pickering, Canada; David J. Sosinsky, Columbia, Md.

[73] Assignee: Tam Ceramics, Inc., Niagara Falls, N.Y.

[21] Appl. No.: 505,847

[22] Filed: Apr. 6, 1990

[51] Int. Cl.$^5$ .............................. C21B 5/04
[52] U.S. Cl. ........................ 75/309; 75/312; 75/301
[58] Field of Search ............... 75/312, 301, 10.56, 75/566; 264/30

[56] References Cited

U.S. PATENT DOCUMENTS

| | | | |
|---|---|---|---|
| 3,598,573 | 8/1971 | Freissmuth et al. | 75/55 |
| 4,037,043 | 7/1977 | Segsworth | 13/9 R |
| 4,154,606 | 5/1979 | Freissmuth et al. | 75/312 |
| 4,194,902 | 5/1980 | Gmohling | 75/312 |
| 4,198,229 | 4/1980 | Katayama et al. | 75/53 |
| 4,447,265 | 5/1984 | Schwer | 75/257 |
| 4,473,397 | 9/1984 | Bleeck et al. | 75/385 |
| 4,528,035 | 7/1985 | Simpson, Jr. et al. | 75/257 |
| 4,842,642 | 6/1989 | Bowman | 75/10.58 |

FOREIGN PATENT DOCUMENTS

| | | | |
|---|---|---|---|
| 136515 | 10/1979 | Japan | 75/312 |
| 2077297 | 12/1981 | United Kingdom | 75/312 |

OTHER PUBLICATIONS

International Symposium on Ladle Steelmaking and Furnaces; Metallurgical Society of CIM, Aug. 28-31, 1988, pp. 130-143.

"Plasma Heating for Ladle Treatment Stations", Iron and Steelmaker, Jul., 1989, pp. 17-22.

L. Wolfe, et al., "Quality Improvements at Border Steel Through Ladle Metallurgy and Caster Modifications," Iron & Steelmaker, pp. 33-41, Jul., 1988.

*Primary Examiner*—Andrews, Melvyn J.
*Attorney, Agent, or Firm*—Kenyon & Kenyon

[57] ABSTRACT

This invention relates to the refining of steel external to a primary steelmaking vessel, for example in the ladle. More particularly, it is: A.) a method of synthesizing a slag on the steel that (i) mitigates the detrimental effects of existing natural slag carried over from the primary steelmaking vessel, (ii) is low in specific bulk density, due to gas evolution and foaming, (iii) is suitable for refining of steel, and (iv) is not aggressive to the ladle refractory lining; B.) a method, and composition for treating any primary slag that has entered the ladle; C.) a method and composition for coating refractory linings. The present invention involves the manufacture in situ of a secondary ladle slag, the treating of ladle slag, and the protection of refractory linings by the addition of materials including calcium carbide, foaming agents such as one or more carbonates of calcium, magnesium, and sodium, and other components used to adjust slag composition. The properties of the secondary ladle slag are engineered using an optical basicity scale.

9 Claims, No Drawings

COMPOSITIONS FOR SYNTHESIZING LADLE SLAGS

FIELD OF THE INVENTION

This invention relates to the refining of steel external to the primary steelmaking vessel, for example, in the ladle. More particularly, it is:
A.) a method and composition for synthesizing a ladle slag on the steel that (i) mitigates the detrimental effects of existing primary slag carried over from the primary steelmaking vessel, (ii) is low in specific bulk density, due to gas evolution and foaming, (iii) is suitable for refining of steel, (iv) is not corrosive to the ladle refractory lining and (v) supports a stable plasma during arc reheating; and
B.) a method, and composition for treating any primary slag that has entered the ladle from the primary steelmaking vessel; and
C.) a method and composition for coating refractory linings, especially at the slag line.

BACKGROUND OF THE INVENTION

For the most part, steel making is a batch procedure involving several steps. Hot molten metal (iron-carbon alloy with impurities) is produced continuously in a blast furnace to produce iron. The molten iron is transported batch-wise, optionally with some scrap steel, to a primary converter, for example a basic oxygen furnace, and is transformed into steel (primary steelmaking) by blowing oxygen to remove carbon and phosphorus. Alternatively, scrap steel may be melted, for example, in a primary electric arc furnace, with oxygen blowing to remove carbon and phosphorus. In both of the above primary steelmaking operations, the steel is usually formed in the presence of a primary slag, mostly composed of oxides including calcium, silicon, iron, manganese, phosphorus, chromium and aluminum. The primary slag is "oxidizing" with respect to acceptable steel oxygen contents prior to casting, and therefore it is not suitable for further steel refining operations. In the past, primary slag was modified within the primary steelmaking vessel and a secondary refining step was carried out to adjust the steel and primary slag compositions and temperature. More recently, such refining steps have been carried out outside of the primary steelmaking vessel, usually in a transfer ladle used to transfer molten steel to a pouring or casting location.

The term ladle, as used herein, describes a vessel usually having a consumable refractory lining which is used for transferring molten metal, particularly steel, from one place to another, for example, from a primary steelmaking furnace to a continuous caster.

Steel refining in the ladle has become common practice in recent years, and is now often combined with arc reheating in the ladle to maintain and control temperature. The ladle slag (secondary ladle slag) is an important aspect of ladle refining because its chemical and physical properties influence the economics of production and the quality of the final steel product. In most ladle refining practices, the molten steel is tapped from the primary steelmaking vessel into a ladle substantially free of primary slag. Alternatively, primary slag may be substantially removed subsequent to tapping into a ladle by raking or similar known processes. Additions are then made to the substantially slag free steel in the ladle to synthesize a new slag with desirable properties, usually referred to as a synthetic ladle slag or secondary ladle slag. Another approach to eliminating primary slag is tapping the primary slag along with the steel, and then treating the primary slag so that it becomes suitable for secondary refining.

Secondary ladle slags should provide various combinations of the following functions and characteristics adapted to specific applications:
1. Provide continuous molten oxide phase on the surface of the steel;
2. Capture and retain inclusive non-metallic material present in the steel;
3. Be non-oxidizing or reducing with respect to the steel;
4. Control sulfur content of the steel;
5. Be non-corrosive to ladle refractory linings;
6. Promote stable arcing during electric arc reheating in the ladle;
7. Protect the steel from contact with the atmosphere, and;
8. Provide thermal insulation.

Individually, components of the secondary ladle slag are not molten at steel refining temperatures. However, by ensuring such components are present in the proper proportions, in the proper particle size ranges and well mixed, it is possible to achieve a molten slag at steel refining temperatures through a process of dissolution of components into each other. To expedite the dissolution process, ladle slag additives should be well mixed together and should be selected so that the individual particles are sized small enough to promote quick dissolution and large enough to ensure even spreading of the added material in the ladle slag across the melt surface. Conventional practice utilizes particle sizes preferably in the range of about 0.50 to about 1.50 inches although small particle sizes may occasionally be employed for specialized purposes. Although this is known in the art, there is disagreement as to the appropriate size of particles. The desirability of thorough mixing of the components prior to addition to the ladle is not widely recognized.

In practice, the dissolution of ladle slag additives to form a continuous molten oxide phase is rarely achieved without the use of fluidizers such as calcium fluoride. A disadvantage of fluidizers such as calcium fluoride is that they can dissolve ladle refractory linings.

Slag additive dissolution may also be expedited by arc heating in the ladle. The intense heat from an arc may cause the slag additive components to melt and dissolve more rapidly. However, overheating of the slag may also increase solubility of the refractory lining material. Another problem with arc heating is that refractory lining wear can be increased by arc instability which can cause hot gas and slag to be propelled against the ladle refractory lining.

Reducing arc instability by using a fluid ladle slag of high basicity is known in the art, as described by Oliver et al., "International Symposium on Ladle Steelmaking and Furnaces," *Metallurgical Society of CIM*, Aug. 28-31, 1988, pages 130-143. Stabilizing the arc by injection of argon through an axial hole in the electrode is also known in the art, as described by Segsworth, U.S. Pat. No. 4,037,043, and by Oliver et al., "Plasma Heating for Ladle Treatment Stations," *Iron and Steelmaker*, July 1989, pages 17-22. These measures can reduce arc instability and thereby reduce the wear rate of refractory linings but they do not eliminate arc instability and it is desirable to find additional ways to promote better arc stability.

Another known approach to stabilizing arcs is the foaming of a slag to engulf the arc, for example, as described in U.S. Pat. No. 4,447,265 and in U.S. Pat. No. 4,528,035. These procedures involve the injection of carbonaceous material, lime, and oxygen into a primary steelmaking furnace during the refining stage. This process is said to be effective in increasing slag volume and protecting the furnace refractory walls from excessive wear. The injection of oxygen, however, produces an oxidizing atmosphere, which is not appropriate for use in ladle arc refining where reducing conditions are desirable. This is unfortunate, since the refractory lining lifetimes could be increased by such a process.

In U.S. Pat. No. 4,198,229, Katayama et al. discuss the use of calcium carbide as a component of synthetic slag for dephosphorization of alloy steel, stainless steel, or ferrochromium. In this technique a combination of calcium carbide, alkali metal halide, and, optionally, calcium metal alloys creates a condition whereby metallic calcium becomes available within the slag phase at the slag/metal interface. This metallic calcium can then combine with phosphorus dissolved in the metal phase to form $Ca_3P_2$ which is assimilated into the slag phase, thereby dephosphorizing the metal. The purpose of the calcium carbide is to dephosphorize not to deoxidize the metal or the slag.

In U.S. Pat. No. 4,842,642, Bowman discusses the use of iron blast furnace slag to flux other components for synthetic ladle slag, especially lime and dolomitic lime, thereby reducing the wear rate of the ladle refractories. This technique is said to hasten the dissolution of MgO into the slag, thus decreasing the duration of non-equilibrium between the MgO in the refractory ladle lining and the MgO dissolved in the slag so that refractory lining wear rate is decreased.

As noted above, attempts are usually made to eliminate primary steelmaking slag from ladle refining processes, either by retention of the primary slag in the primary steelmaking furnace or by raking from the surface of the melt in the ladle, or both. The degree of success of these processes is variable and unpredictable. Some primary slag usually remains on the steel in the ladle when secondary refining is commenced. It is known to add reductants such as ferrosilicon or aluminum to the slag or to the ladle during filling to reduce the iron oxide and manganese oxide carried over in the steelmaking primary slag. However, if added in excess, these reductants dissolve in the steel, making the steel chemistry variable and difficult to predict. In addition the reaction products associated with these reductants may be acidic with respect to ladle refractory linings, and therefore increase the solubility of lining material in the slag thereby increasing the wear rate of the lining. Carbon has been used as such a reductant but the efficiency is low and unpredictable due to the low density of the carbon additives with respect to the slag and reactivity of the carbon with the air above the ladle. Carbon is also soluble in steel, and may be picked up by the steel during the process, thereby altering the steel chemistry which, in many cases, is unacceptable.

The technique of slag foaming has been successfully used in the electric arc steel melting (primary) furnace for the purpose of increasing slag volume, stabilizing the arcs, and lengthening the service life of refractories. The steel furnace is an oxidizing environment (one of the functions is to oxidize carbon out of the steel), so slag foaming is accomplished by injecting particulate carbon and lime into the furnace, along with oxygen blown from a lance, or with iron oxide materials. The carbon combines with the oxygen source to form CO gas and causes foaming of the slag. The injected lime cools the slag to stabilize the foam. This practice has been suggested for use in the ladle, but is not appropriate because of the need to inject oxygen or iron oxide, both undesirable in the ladle steel refining process. Foaming agents that absorb heat when releasing gases are traditionally not used in ladle refining processes.

The use of a reductant for reducing iron oxide in ladle slag is also known, but the materials used thus far have disadvantages. Aluminum is expensive, increases alumina content of the slag, and is an alloying element in the steel, so variability of its concentration is undesirable. Ferrosilicon also results in the increase of slag acidity, and silicon is also an alloying element which has specified composition ranges in steel.

ADVANTAGES AND SUMMARY OF THE INVENTION

An object of the present invention is to provide a method and composition for synthesizing a secondary slag on molten steel in a ladle that (i) mitigates the above-noted detrimental effects of existing primary slag carried over from the primary steelmaking vessel; (ii) is low in specific bulk density, due to gas evolution and foaming; (iii) is suitable for refining of steel; and (iv) does not aggressively attack conventional ladle refractory linings.

Another object is to provide a method, and composition for treating primary slag in the ladle in order to reduce the wear rate of conventional refractory linings.

Still another object is to provide a method and composition for coating refractory linings.

The invention offers the following advantages: (1) a practical way to select slag additives through phase diagrams and optical basicity mathematical models to attain predictable removal of impurities and to match refractory materials, (2) a practical way to create foaming slags through controlled gas release which is non-oxidizing, allows better thermal insulation and, through lower density, requires less pounds of flux (e.g., 8-15 pounds per ton versus 10-25 pounds per ton in current practice) and (3) a predictable way to use calcium carbide to reduce FeO to Fe in the ladle.

The value to steelmakers lies in the potential to: (1) increase ladle refractory life and lower costs through improved arc stability and decreasing slag corrosiveness to the refractory lining, (2) improve thermal insulation and thereby reduce energy costs, (3) improve steel quality through controlled metallurgy affecting sulphur, phosphorous, hydrogen, oxygen, non-metallic inclusions, or other impurity contents of the steel, and (4) control FeO reduction to Fe thereby improving alloy yields and reducing the need for costly raking of primary steelmaking slag from the ladle.

The present invention provides for the manufacture in situ of a secondary slag by the addition of a mixture of materials including calcium carbide, one or more foaming agents, e.g., alkali metal salts, alkali earth metal salts, carbonate salts preferably selected from the group consisting of calcium, magnesium, sodium, barium, strontium, lithium and potassium carbonates, and slag modifiers containing components such as silica, calcium fluoride, alumina, carbon, lime, magnesia, and calcium aluminate which are required to achieve the desired slag composition. Depending upon specific conditions at each ladle refining installation, it may be appropriate to manufacture in situ a secondary slag in more than one step through more than one addition of mixtures of the above materials.

The calcium carbide reduces iron oxides in the slag, reacts with slag components to produce CO or $CO_2$ which causes foaming and increases slag volume which shields the ladle walls from arc flare (CO has the additional benefit of stabilizing the arc); reacts with $CO_2$ produced by the carbonate foaming agent; and reacts with oxygen.

The foaming agent releases gas, e.g., $CO_2$ which causes foaming and increased slag volume which shields the ladle walls from arc flare; release gas, e.g., $CO_2$ which has a low oxygen potential with respect to air and is therefore gas shielding; and releases $CO_2$ which will react with calcium carbide leaving lime as the reaction product within the slag.

The slag modifiers have various functions known in the art, for example, glass and calcium fluoride act as fluxes, i.e., solubilize, other ingredients. Alumina and lime are slag formers. Coke acts as both a reducing agent and a protectant for the calcium carbide because it reacts with air more quickly than calcium carbide to produce CO, thereby protecting the calcium carbide from oxidation. It should be noted that each component may serve multiple functions.

It has been found that an average particle size of about 0.25 to 0.50 inch is preferred for the practice of this invention although other ingredients, e.g., soda ash, may be employed which are not commonly available within this preferred particle size range.

The present invention also provides a method for reducing the density of non-oxidizing slags, e.g., ladle slags comprising the steps of adding a foaming agent which undergoes a chemical reaction in the slag that produces a gas. The foaming agent is preferably a carbonate salt, most preferably selected from the group consisting of calcium carbonate and magnesium carbonate.

It should be appreciated that although the invention is discussed in the context of secondary steelmaking, i.e., secondary ladle slags, the invention has applicability to a wide range of refining procedures. Similarly it should be understood that the sequence of steps and addition of composition components in accordance with the invention may be varied substantially depending upon the requirements of a particular application.

DETAILED DESCRIPTION OF THE PREFERRED EMBODIMENTS

Basicity is a common measure of slag chemical properties and characteristics. Several scales are used, the most common being the "V ratio" or:
A modified version of this ratio also includes magnesia and alumina:
These basicity ratios, however, do not take into account other oxides, which contribute to slag basicity and influence characteristics, whereas the optical basicity scale does.

Although not yet commonly used, the optical basicity scale is known in the art, as described by I. D. Sommerville and D. J. Sosinsky, "The Application of the Optical Basicity Concept to Metallurgical Slags," *Second International Symposium on Metallurgical Slags and Fluxes*, AIME, Nov. 11-14, 1984, pages 1015-26. The optical basicity concept is advantageously used with the present invention to predict the chemical and physical behavior of slags. All slag components are assigned a basicity value by this technique, and an aggregate value is calculated according to the principles set forth in the above mentioned reference.

The components can be added at different stages. The compositions of this invention are formulated as follows:

The final slag properties and characteristics required desired for a given ladle refining system can be calculated; the primary slag components, e.g., carry-over furnace slag, are approximated. Based on the approximation, the quantity of calcium carbide equivalent to the stoichiometric requirement to reduce the maximum anticipated amount of iron and manganese oxides is calculated and this quantity is taken as the minimum amount of calcium carbide required in the slag additive; the solubility of magnesia in the final desired slag composition is determined, and that amount will be added in the form of magnesium carbonate and other magnesia containing materials in the slag additive; and further gas releasing potential is provided by adding calcium and sodium carbonates to the slag.

The addition of other additives containing components such as silica, calcium fluoride, alumina, carbon, lime, magnesia, and calcium aluminate, will round out the requirements necessary to achieve the desired slag properties. Depending upon specific conditions at each ladle refining installation, it may be appropriate to manufacture in situ a secondary slag in more than one step through more than one addition of mixtures of the above materials.

The slag additives are added to the ladle during the tapping of steel, approximately one-half to two-thirds through the tap, or alternatively to the top of the steel after the tap.

There are two components in the composition that, acting in combination with the other components, provide the advantages of the invention: calcium carbide ($CaC_2$), and carbonates of calcium, magnesium, sodium, potassium, lithium, strontium, barium ($CaCO_3$, $MgCO_3$, $BaCO_3$, $SrCO_3$, $Li_2CO_3$, $Na_2CO_3$ and $K_2CO_3$) or a combinations thereof, the most commonly used being calcium, magnesium and sodium carbonates. A conventional source of calcium carbonate is limestone. A conventional source of magnesium and calcium carbonate is dolomite or dolomitic limestone. A purpose of the carbonates is to release carbon dioxide gas ($CO_2$) when added as part of a slag system, thereby causing the slag to foam and increase in volume (decrease in apparent density). The foamed slag is beneficial in that it better shields the ladle refractory walls from the damaging effects of arc flare common to ladle reheating furnaces. The gas evolved has a low oxygen potential relative to the air above the ladle, so a gas shielding effect is also realized. In addition they may effect a decrease in the specific weight of other additives required to accomplish the objectives known in the art: refining of the steel, arc stability, protection from the environment, prevention of ladle refractory erosion, etc.

The effectiveness of the slag compositions is further enhanced by the novel use of calcium carbide. The calcium carbide serves two purposes. Firstly, it is a powerful reductant that will act on any iron oxide and manganese oxide (or any other oxide that is easily reduced) present in the ladle, i.e., due to the carry-over of furnace slag during tapping. Aluminum and ferrosilicon have been used for this purpose, but they leave an acid oxide reaction product which can be damaging to basic ladle linings. Calcium carbide leaves behind lime as a reaction product which is compatible with basic ladle linings and otherwise desirable. Aluminum and silicon are soluble in steel, whereas calcium has minimal solubility and is not undesirable. Contact of calcium carbide with steel results in a lower chance of carbon dissolution than contact of carbon with steel. Calcium carbide is believed to be better wetted by slag than is carbon so calcium carbide will react more readily with slag. Secondly, any excess calcium carbide will react with the carbon dioxide evolved from the carbonates, the carbonates themselves, or any oxygen present in or over the ladle slag. This will increase gas volume and aid foaming, and ensure that the calcium carbide is completely utilized, preventing slag disposal problems and minimizing carbonization of the steel. Thus, calcium carbide may be used in excess without detrimental effects. This is very useful, since the quantity of iron and manganese oxides in the slag is generally variable and unpredictable, and a stoichiometric amount of calcium carbide reductant would be virtually impossible to predict with precision.

Table 1 shows examples of compositions which may be used to synthesize ladle slags and treat ladle slags. It should be noted that all amounts expressed as percents in the specification, tables and claims are in wt % unless otherwise specified.

TABLE 1
COMPOSITIONS FOR LADLE SLAG
SYNTHESIS AND TREATING LADLE SLAGS

|  | Range (%) | Preferred Range (%) |
|---|---|---|
| MAGNESIUM CARBONATE | 0–30 | 10–20 |
| CALCIUM CARBONATE | 0–60 | 4–55 |
| SODIUM CARBONATE | 0–35 | 0–5 |
| GLASS | 0–20 | 0–10 |
| CALCIUM FLUORIDE | 0–25 | 0–10 |
| ALUMINA | 0–40 | 5–20 |
| COKE | 0–10 | 2–5 |
| CALCIUM CARBIDE | 2–55 | 5–50 |
| LIME | 0–35 | 0–25 |
| BLAST FURNACE SLAG | 0–9 | 0–9 |
| CALCIUM ALUMINATE | 0–50 | 0–25 |

Table 2 shows examples of compositions which may be used to synthesize ladle slags.

TABLE 2
COMPOSITIONS FOR LADLE SLAG SYNTHESIS 1. 15% Magnesium Carbonate
   58% Calcium Carbonate
   17% Alumina
   5% Soda Ash or Sodium Carbonate
   4% Calcium Carbide
   1% Coke
   100%

2. 60% Calcium Carbonate
   5% Calcium Fluoride
   2% Coke
   3% Calcium Carbide
   30% Alumina
   100%

3. 16.5% Calcium Carbonate
   13.5% Magnesium Carbonate
   20.5% Lime
   9.0% Blast Furnace Slag
   14.5% Alumina
   20.0% Calcium Aluminate
   4.0% Calcium Carbide
   2.0% Coke
   100.0%

Table 3 shows examples of compositions which may be used to treat ladle slags.

TABLE 3
COMPOSITIONS FOR TREATING LADLE SLAGS 1. 48% Calcium Carbide
   21% Magnesium Carbonate
   27% Calcium Carbonate
   4% Coke
   100%

2. 50% Calcium Carbide
   46% Calcium Carbonate
   4% Coke
   100%

3. 50% Calcium Carbide
   20% Calcium Carbonate
   20% Alumina
   5% Coke
   5% Calcium Fluoride
   100%

Table 4 shows examples of compositions which may be used to protect refractory linings in the ladle.

TABLE 4
COMPOSITIONS FOR COATING REFRACTORY LININGS 1. 50% Calcium Carbide
   50% Calcium Carbonate
   100%

2. 35% Calcium Carbonate
   25% Magnesium Carbonate
   40% Calcium Carbide
   100%

EXAMPLE 1

Approximately 150 tons of steel were melted in an electric arc furnace and tapped into a ladle. Although every effort was made to retain all the primary slag within the arc furnace, about 1 inch of primary furnace slag was observed on average, with some heats having as much as 2 inches. The primary slag weight on the ladle was therefore estimated to range from 200 to 1,000 lbs, depending on the degree of success in the attempt to retain the slag in the arc furnace. A synthetic slag was desired to reduce any iron and manganese oxides in the ladle, provide insulation, absorb non-metallic inclusions, minimize refractory ladle lining attack, protect the steel from reoxidation, and control the steel sulfur content. In this example, it was desired that the slag not remove sulfur from the steel. To fulfill the latter requirement, a non-reactive slag with an optical basicity low enough to retain a steel sulfur content of about 0.025 wt % was desired, with the average starting sulfur content being 0.030 wt %. A flux addition was formulated containing ingredients in the following proportion:

42% dolomite, 17% soda ash, 1% wollastinite, 16% glass, 9% fluorspar, 10% alumina, 1% metallurgical coke,[1] 4% calcium carbide.

[1] The coke used herein is metallurgical coke, however, it should be understood that other sources of carbon reductant could be used.

The flux ingredients were sized in the range ¼ inch by down, and were well mixed. Near the end of the furnace tapping procedure, a flux addition of 1,500 lbs was made into the tapping stream. Argon stirring was then applied at a rate of about 6 scfm for 10 minutes. The resulting synthetic slag was foamy, insulating, and fluid at the slag-metal interface. Iron and manganese oxide contents were below 2%. The steel sulfur content was controlled at 0.026 wt %, with a starting sulfur of 0.030 wt %. Slag line refractory damage was not observed. All the objectives of the snythetic slag were realized.

EXAMPLE 2

About 150 tons of steel were melted in an electric arc furnace and tapped into a ladle, along with about 2000 lbs of synthetic slag forming mixture containing lime, aluminum and fluorspar. Heavy stirring was applied at a rate of about 24 scfm with the purpose of creating an emulsion of fluid slag and steel, thereby desulfurizing the steel to a low sulfur level. The resulting fluid slag was known to be aggressive to the ladle refractory lining. For the purpose of foaming the slag, decreasing the solubility of the refractory lining and promoting arc stability during steel reheating, a slag conditioner with the following composition was added: 48% metallurgical grade calcium carbide, 48% dolomite, 4% metallurgical coke.

The purpose of the slag conditioner was to add basic refractory ingredients to the slag, and to evolve gas to foam the slag and to provide an arc stabilizing effect. The conditioner was added in the amount of 300 lbs through an additions port at the ladle treatment station, prior to the application of electric arc reheating in the ladle. Slag foaming was observed, and the characteristic splashing of slag and metal during arc reheating was observed to be reduced. Although not immediately, the effect of increased arc stability was also observed. After reheating was complete, the ladle was removed from the treatment station for observation. The slag maintained a foamy appearance, and was much darker in color on the surface than is observed without the conditioner addition, indicating a foamed and insulating condition.

EXAMPLE 3

Hot metal (iron-carbon alloy) is converted to steel in a steel making vessel. The steel is tapped into a ladle along with alloy additions, including deoxidizers. Near the end of tap, a slag modifier is added in the amount of 1.5 to 2 lbs per ton of steel. The modifier has the composition:

50% calcium carbide, 48% dolomitic limestone, 2% metallurgical coke.

After the tap and additions are complete, the ladle is transferred to a slag raking station, where as much of the slag is raked off as is practical. The ladle is transported to an arc reheating and ladle treatment facility, where a flux addition is made in the amount of 10 to 15 lbs per ton of steel, the flux composition being:

58% calcium carbonate, 17% magnesium carbonate, 17% alumina, 6% glass, 2% metallurgical coke.

Arc reheating, gas stirring, compositional adjustments and analysis are then carried out as required.

EXAMPLE 4

Hot metal (iron-carbon alloy) is converted to steel in a steel making vessel. The steel is tapped into a ladle along with alloy additions, including deoxidizers. During tap, preferably near the end of tap, a slag modifier is added in the amount of 2 to 10 lbs per ton of steel. The modifier has the composition:

50% calcium carbide, 20% calcium carbonate, 17% magnesium carbonate, 5% fluorspar, 5% alumina, 3% metallurgical coke.

The ladle is then transported to the ladle treatment station where secondary refining is carried out as necessary.

EXAMPLE 5

Steel is melted in an electric arc furnace and tapped substantially slag-free into a ladle. A synthetic slag is formed by addition of a flux, either near the end of tap or after tap, in the amount of 10 to 15 lbs per ton of steel, having the following composition:

24% lime, 2% of calcium aluminate, 17% calcium carbonate, 14% magnesium carbonate, 9% alumina, 9% blast furnace slag, 5% calcium carbide, 2% metallurgical coke.

The ladle is transported to a ladle treatment facility. During ladle treatment, especially if arc reheating is employed, periodic additions are made in the amount of 0.5 to 3 lbs per ton of a slag conditioner with the following composition:

50% calcium carbonate, 30% magnesium carbonate, 5% sodium carbonate, 5% blast furnace slag, 5% glass, 5% alumina.

Alternatively, the above-conditioner is added continuously to the ladle during treatment at a rate of about 0.1 to 0.3 lbs per ton of steel per minute.

EXAMPLE 6

Steel is melted in an electric arc furnace and tapped into a ladle, along with 10 to 20 lbs per ton of steel of synthetic slag forming mixture containing lime, aluminum and fluorspar. Heavy stirring is applied at a rate sufficient to create an emulsion of fluid slag and steel, thereby desulfurizing the steel to a low sulfur level. The resulting fluid slag is known to be aggressive to the ladle refractory lining. For the purpose of foaming the slag and decreasing the solubility of the refractory lining, a slag conditioner with the following composition is added in the amount of 1 to 4 lbs per ton of steel:

50% calcium carbonate, 30% magnesium carbonate, 5% sodium carbonate, 5% blast furnace slag, 5% glass, 5% alumina.

Alternatively, the above conditioner is added continuously to the ladle during treatment at a rate of about 0.1 to 0.3 lbs per ton of steel per minute.

EXAMPLE 7

A hot ladle is prepared to receive steel from a furnace. A gunning mixture, having the following composition, is sprayed onto the slag line area of the refractory lining:

50% calcium carbide, 50% dolomitic limestone.

Steel is then tapped into the ladle, and secondary refining is commenced.

What is claimed is:

1. A composition for synthesizing and treating ladle slags comprising about 5% to about 50% calcium carbide, about 10% to about 20% magnesium carbonate, about 40% to about 55% calcium carbonate, abut 5% to about 20% alumina, and about 2% to about 5% coke sized to prevent substantial reaction with the molten steel melt.

2. A composition for synthesizing and treating ladle slags comprising about 5% to about 50% calcium carbide; about 10% to about 20% magnesium carbonate; about 4% to about 55% calcium carbonate, about 0% to about 5% sodium carbonate; about 0% to about 10% glass; about 0% to about 10% calcium fluoride; about 5% to about 20% alumina; about 2% to about 5% coke; about 0% to about 25% lime; about 0% to about 9% blast furnace slag; and about 0% to about 24% calcium aluminate sized to prevent substantial reaction with the molten steel melt.

3. A composition for synthesizing ladle slags comprising abut 4% calcium carbide; about 15% magnesium carbonate; about 58% calcium carbonate; about 17% alumina; about 0% to about 5% soda ash or about 0% to about 5% sodium carbonate; and about 1% coke.

4. A composition for synthesizing ladle slags comprising about 3% calcium carbide; about 60% calcium carbonate; about 5% calcium fluoride; about 2% coke; and about 30% alumina.

5. A composition for synthesizing ladle slags comprising about 4.0% calcium carbide; about 16.5% calcium carbonate; about 13.5% magnesium carbonate; about 20.0% lime; about 9.0% blast furnace slag; about 15.0% alumina; about 20.0% calcium aluminate; and about 2.0% coke.

6. A composition for treating ladle slags comprising about 48% calcium carbide; about 21% magnesium carbonate; about 27% calcium carbonate; and about 4% coke.

7. A composition for treating ladle slags comprising abut 50% calcium carbide; about 46% calcium carbonate; and about 4% coke.

8. A composition for treating ladle slags comprising about 50% calcium carbide; about 20% calcium carbonate; about 20% alumina; about 5% coke; and about 5% calcium fluoride.

9. The composition for synthesizing and treating slags of claim 1, 2, 3, 4, 5, 6, 7 or 8, wherein the average particle size is in the range of about 0.25 to about 0.5 inch.

* * * * *